Sept. 20, 1932.  H. D. SEVISON  1,878,898
SCREW MOUNTING
Filed March 11, 1929
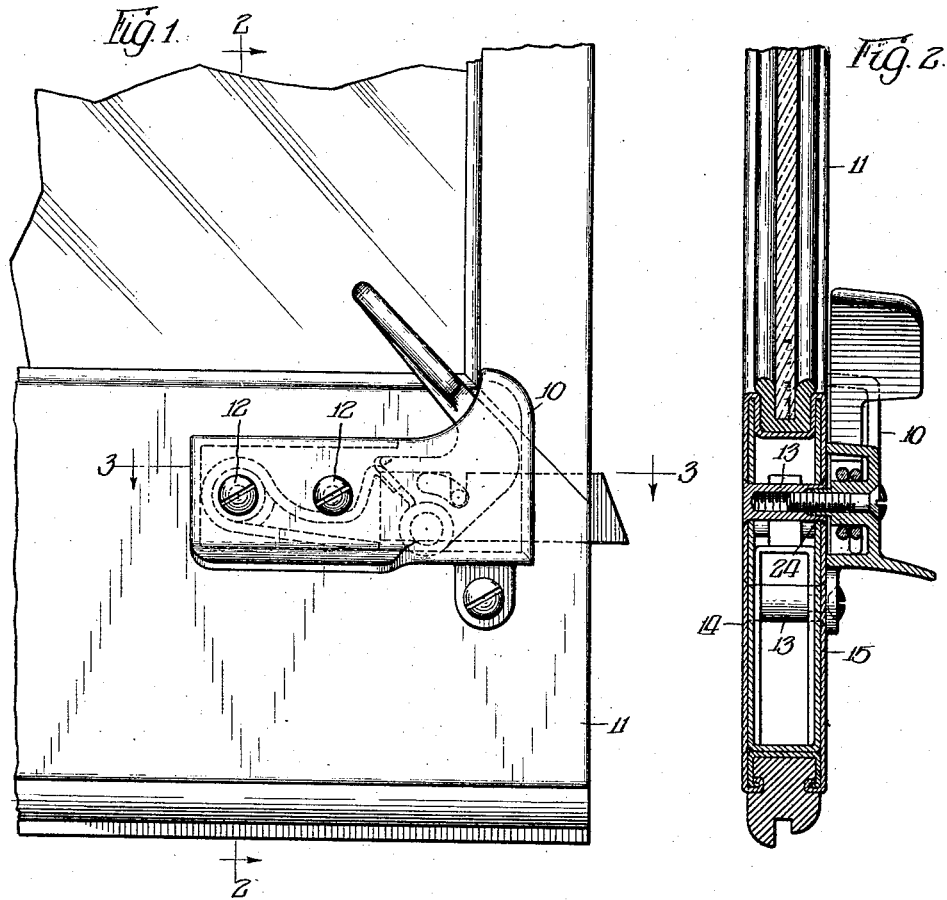
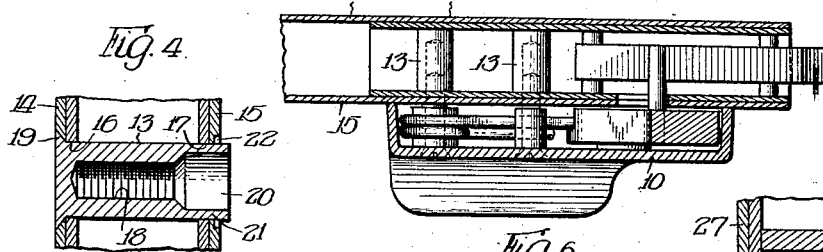
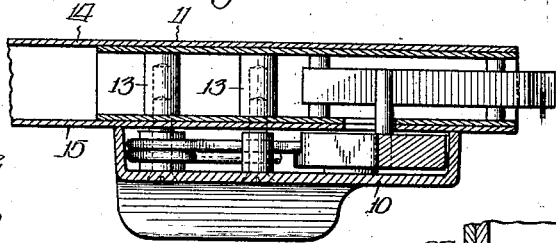
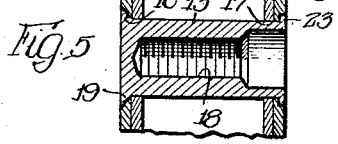
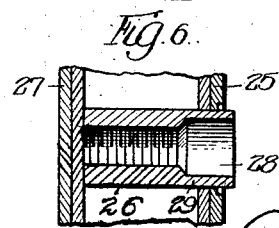
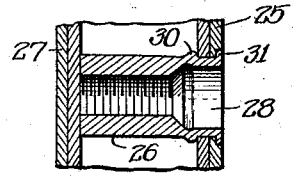
Inventor:
Harry D. Sevison, Patented Sept. 20, 1932

1,878,898

UNITED STATES PATENT OFFICE

HARRY D. SEVISON, OF ELKHART, INDIANA, ASSIGNOR TO THE ADLAKE COMPANY, OF CHICAGO, ILLINOIS, A CORPORATION OF ILLINOIS

SCREW MOUNTING

Application filed March 11, 1929. Serial No. 346,024.

This invention has to do with the mounting of the screws used in attaching locks, lifts, handles and other appurtenances to hollow sheet metal window sash.

The principal object of the invention is to provide a novel screw anchorage which is strong, simple, inexpensive to manufacture and easy to install.

Other objects and advantages of the invention will be apparent to those skilled in the art upon a full understanding of the construction, arrangement, uses and advantages of the improved bushing which constitutes the subject matter of the invention.

In order that the invention may be readily understood, two slightly different embodiments of the same are presented herein, but it will of course be appreciated that such forms are selected merely for the purpose of exemplification, and that the invention is capable of embodiment in other forms coming equally within the scope of the appended claims.

In the accompanying drawing:

Fig. 1 is a side view of one corner of a hollow sheet metal sash, to which a lock has been secured by the employment of bushings constructed and applied in accordance with the invention;

Fig. 2 is a horizontal section, taken on the line 2—2 of Fig. 1;

Fig. 3 is a vertical section, taken on the line 3—3 of Fig. 1;

Fig. 4 is a diametric section through a bushing similar to that shown in Fig. 2, showing the bushing prior to deformation;

Fig. 5 is a similiar view, showing the same bushing after deformation;

Fig. 6 is a diametric section through a modified form of the bushing, showing the bushing before deformation; and Fig. 7 is a similar view, showing the same bushing after deformation.

In the drawing a lock plate 10 is shown as attached to one corner of a hollow sheet metal sash 11 by screws 12. The screws are afforded an anchorage in the sash by bushings 13, which bushings constitute the subject matter of the present invention.

In the form of the invention illustrated in Figs. 1 to 5 inclusive, the spaced side walls 14 and 15 of the sash are provided at the locations of the screws with aligned apertures 16 and 17, and the bushings are positioned crosswise of the sash in such apertures. The bushings are cylindrical, and are provided with threaded axial bores 18 for the reception of the screws. The rear ends of the bushings are preferably closed, and are provided with slightly enlarged and preferably beveled rims 19 for countersunk interlocking engagement with the apertures 16 in the side wall 14, while the front ends of the bushings into which the screws are inserted are preferably reamed out to form sockets 20 having thin side walls 21. The front ends of the bushings project slightly beyond the outside face of the front side wall 15 when the bushings are first inserted, and such projecting portions, after the sleeves have been properly positioned, are either spun, turned or upset outwardly, from the position shown in Fig. 4 to that shown in Fig. 5, into countersunk portions 22 of the apertures 17, whereby to bring the front ends of the bushings flush with the outside face of the front side wall 15. The outward deformation of the portions 23 of the bushings is effected with a force which is sufficient to thereafter hold the bushings firmly against either axial or turning movement in the sash, with the result that excellent screw anchorages are provided and the sash is greatly strengthened and reinforced at the locations of the screws. When the screws 12 are positioned in the bushings with the lock plate 10 in place, the sockets 20 in the front ends of the bushings about the screws serve to accommodate tubular studs 24 formed in the portions of the lock plate through which the screws pass, thereby entirely relieving the screws from any sheering strains which would otherwise be transmitted to the same when the lock plate is used as a lift.

A modification of the bushing is shown in Figs. 6 and 7. In that form of the invention only the front side wall 25 of the sash is apertured, and the rear end of the bushing 26 abuts against the inside face of the rear side wall 27. As in the form of the invention first described, the front end of the bushing when first inserted in the sash projects slightly beyond the outside face of the front side wall 25, with the socket 28 extending rearwardly in the bushing to a point slightly beyond the plane of the inside face of the front side wall. After the bushing has been properly positioned within the sash, an upsetting force is applied axially to the front end of the bushing, causing the thin side wall 29 of the socket to be bulged outwardly against the inside face of the front side wall, in the form of an annular rib 30, and the extreme front edge of the sleeve to be flared outwardly, in the form of a radial flange 31. The formations 30 and 31 are produced with sufficient force to hold the bushing securely against either axial or rotary movement in the sash.

I claim:

1. The combination with a hollow sheet metal sash having apertures in one of the side walls thereof, and a lock plate for application to the sash, of interiorly screw-threaded bushings positioned crosswise of the sash in such apertures behind the lock plate and terminating substantially flush with such apertured side wall, screws passing through the lock plate into the bushings, and means independent of the screws for preventing both axial and rotary movement of the bushings in the sash.

2. The combination with a hollow sheet metal sash having an aperture in one of the side walls thereof, and a lock plate for application to the sash, of an interiorly screw-threaded bushing positioned crosswise of the sash in such aperture, a screw passing through the lock plate into the bushing, and means for preventing both axial and rotary movement of the bushing in the sash, said lock plate having a tubular positioning projection about the screw in alignment with the aperture in the sash, and said bushing having one end counterbored for the reception of said projection.

3. The combination with a hollow sheet metal sash having a socket in one face thereof and a threaded bore in the bottom of the socket, of a lock plate positioned against the sash and having a stud thereon extending into the socket, and a screw extending from the stud into the threaded bore for clamping the lock plate to the sash.

4. The combination with a hollow sheet metal sash having a socket in one face thereof and a threaded bore in the bottom of the socket, of a lock plate positioned against the sash and having a tubular stud thereon extending into the socket, and a screw passing through the stud into the threaded bore for clamping the lock plate to the sash.

5. The combination with a hollow sheet metal sash having an aperture in one of the side walls thereof, of a lock plate for application to the sash, an interiorly screw-threaded bushing positioned crosswise of the sash in such aperture in end abutment with the opposite side wall of the sash, and a screw passing through the lock plate into the bushing for clamping the lock plate against the sash, said bushing being expanded about both the inner and outer edges of the opening in the side wall whereby to prevent either rotary or axial movement of the bushing.

6. The combination with a hollow sheet metal sash having apertures in one of the side walls thereof, and a lock plate for application to the sash, of interiorly screw-threaded bushings positioned crosswise of the sash in such apertures, screws passing through the lock plate into the bushings, and means independent of the screws for preventing both axial and radial movement of the bushings in the sash, said means consisting of outwardly pressed formations on the outer surfaces of the bushings.

7. The combination with a hollow sheet metal sash having aligned apertures in the opposed side walls thereof, and a lock plate for application to the inner side wall of the sash, of interiorly screw-threaded bushings provided with conical heads and positioned crosswise of the sash in such apertures with the conical heads in wedged engagement within the apertures in the outer side wall, screws passing through the lock plate into the bushings, and means independent of the screws for preventing both axial and radial movement of the bushings in the sash, said means consisting of outwardly pressed formations on the outer surfaces of the bushings.

In witness whereof I have hereunto subscribed my name.

HARRY D. SEVISON.